Sept. 29, 1964  S. STORCHHEIM  3,150,973
METHOD OF FABRICATING NUCLEAR FUEL ELEMENTS AND THE LIKE
Filed July 2, 1958
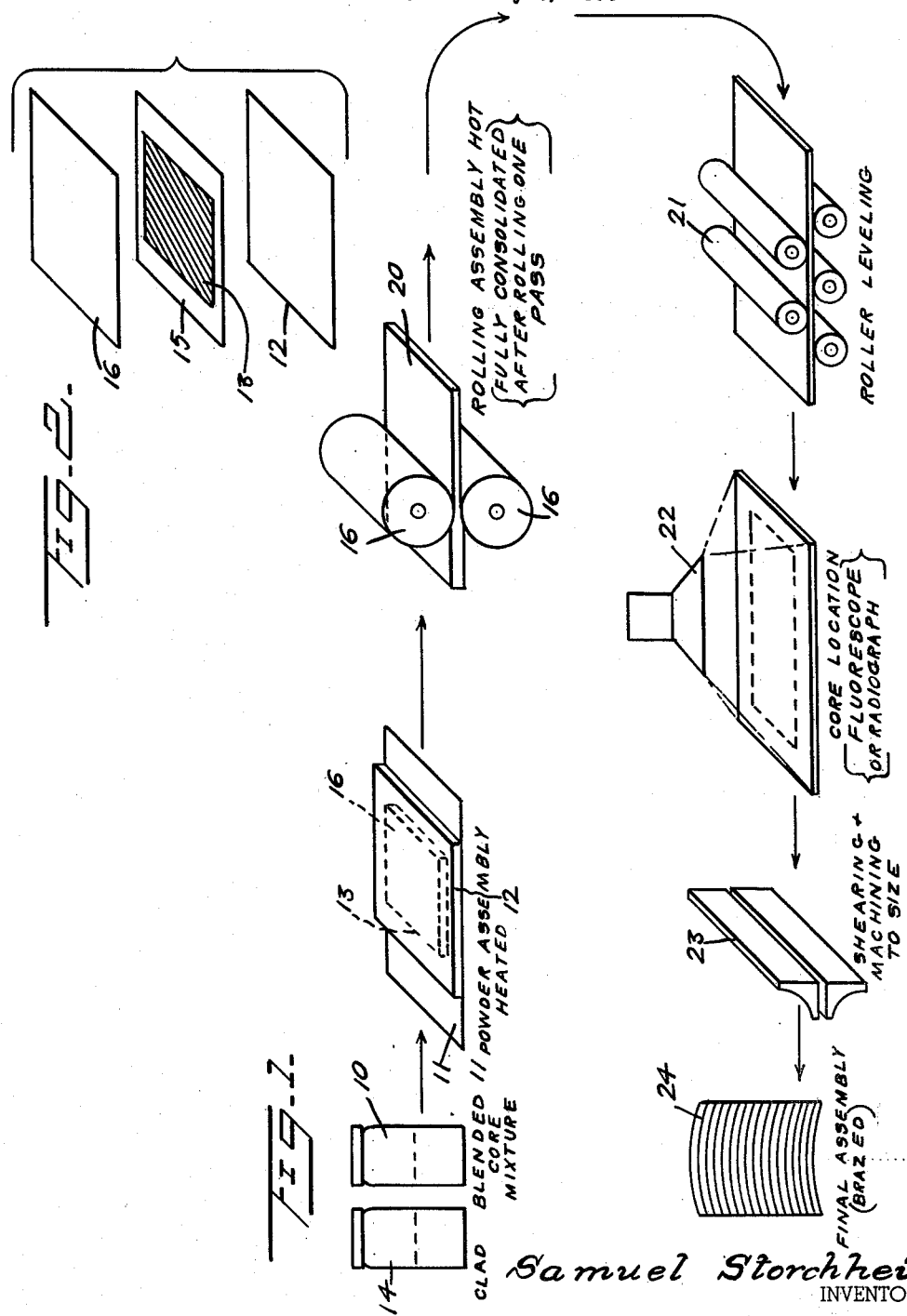
Samuel Storchheim
INVENTOR 3,150,973
METHOD OF FABRICATING NUCLEAR FUEL
ELEMENTS AND THE LIKE
Samuel Storchheim, Kingston, Pa., assignor to Alloys
Research & Manufacturing Corporation, a corporation
of Delaware
Filed July 2, 1958, Ser. No. 746,260
7 Claims. (Cl. 75—208)

This invention relates to an improved method of fabricating nuclear fuel elements and the like, and has as its primary object the provision of a novel method of fabricating such elements employing powder metallurgy.

An additional object of the invention is the provision of such a method requiring a minimum of core and clad preparation, and a minimum of parts and apparatus.

An additional object of the invention is the provision of such a method incorporating a relatively small number of rolling steps in contrast to hitherto known methods and a minimum number of heat treating steps.

An additional object of the invention is the provision of an improved and simplified process, which may be readily carried out by comparatively untrained personnel.

As conducive to a clearer understanding of this invention it may here be pointed out that in the present processes of manufacturing nuclear fuel elements, numerous complicated and involved and costly manufacturing steps are necessary. One of the major drawbacks to the nuclear program is the fact that processing expenses for fuel elements are exorbitantly high. An important object of the instant invention resides in the provision of a method which utilizes powder metallurgy techniques such that the costs for processing nuclear fuel elements are materially decreased.

An additional important object of the invention is the provision of a method of producing nuclear fuel elements utilizing powder metallurgy whereby the elements produced are extremely dense (95% to 99% of theoretical), have excellent physical, mechanical and chemical properties, whereby the fissile material in the core of the elements is distributed uniformly and randomly throughout the body of the core and whereby little or no stringering of the fissile material is obtained and crystallographic preferred orientation is held to an absolute minimum.

An additional very important object of the invention is the provision of a method wherein the bond interface normally existing between the clad and core of such an element, which is a potential location for failure is eliminated.

Such elimination results from the fact that no solid parts are placed together in the instant method. In methods heretofore produced the juxtaposition of solid parts prior to processing produced a line contact after bonding. By virtue of the instant invention wherein the clad and core are initially composed of powders, which powders intermix across what would normally be a line interface of two solid parts mechanically joined, and subsequent consolidation of these powders provides a fully integrated interface. By virtue of such an integrated face the core may basically be recognized and defined only by the appearance of fissile material contained in the core itself, provided the core matrix material is the same as that of the clad metal.

Broadly the manufacturing technique involved in the fabricating of the nuclear fuel elements of the instant invention comprises the steps of placing a layer of powdered clad material on a carrier, and then superposing on such layer a second layer of powdered core material, the layer of core material being of less extent than the layer of clad material. The layer of core material is bordered by plain clad type powder, which preferably is identical to that of the powder of the first layer of clad material. A top layer of clad material is then superposed on the layer of core material, in such manner that the core is effectively covered on all six sides with plain powder material containing no fissile matter. The assembly is heated, and while hot is passed through the rolls of a rolling mill so that all the useful properties mentioned above are attained.

In the drawings:
FIGURE 1 is a diagrammatic schematic view of a process incorporating apparatus illustrative of the several steps embodied in the process of the instant invention.

FIGURE 2 is an exploded perspective view of the various layers of powdered material comprising the elements prior to processing.

In the diagrammatic showing powdered clad material is taken from the container 14 and superposed on a desired carrier element 11, which may be comprised of metal. The lower layer of clad material is shown at 12 in FIGURE 2, and on the layer 12 is superposed a second layer of powdered fissile material which may be taken from any suitable source represented by the container 10. The layer 13 is bordered by non-fissile powdered material 15, preferably identical to the material comprising the powder layer 14, and a second layer 16 of non-fissile matter is superposed on top of the layer 13. The entire assembly is then heated in any desired manner, and passed between suitable hot rolling mechanism represented by the rollers 16, and compressed at a desired degree of pressure and temperature into a compacted solid metal core element 20. Suitable apparatus is then provided for passing the element after consolidation through an additional series of rollers 21 for the purpose of roller levelling and smoothing, whereupon the article is passed to suitable core locating apparatus which may be of any desired conventional fluoroscopic or radiographic type, such apparatus being indicated at 22. The succeeding step of the apparatus after the location of the core comprises shearing, by means of suitable machinery schematically indicated at 23, and machining the element to size. The element 20 is then passed to final assembly, where it is suitably brazed or otherwise finished, in desired conventional apparatus schematically indicated at 24.

Any suitable materials may be employed in powdered form in the manner above described, and an illustrative example resides in the manufacture of aluminum fuel elements. In employing such elements the core material may desirably be an aluminum uranium alloy containing up to 40% by weight of uranium. Alternatively another type of fissile material might be $UO_2$ or $U_3O_8$, which materials may be incorporated in the core in percents up to 75 by weight. Plain aluminum powder may be suitably employed for the protective clad or the matrix binder, or alternatively alloys of aluminum containing from one to two percent of nickel. Such materials show excellent resistance to high temperature water corrosion.

Any suitable carrier may be employed for the powder layers. Under certain instances, as for example, when employing aluminum type fuel elements the carrier may be an expendable sheet of low carbon steel. The steel is oxidized prior to the laying of the layers of powdered clad and core material thereon, so that after the hot powder rolling the steel may be stripped away from the consolidated aluminum fuel elements.

The size of the fuel elements may be varied in accordance with conditions, and is largely determined by the rolling mill diameter employed. For example, in employing a fifteen inch diameter rolling mill, elements as thick as ⅛ of an inch may be readily fabricated. The powders can be heated not only to temperatures as high as 600° C., but in the case of aluminum even above the melting point of the aluminum powder. The reason for this is that the normally present aluminum oxide film on each particle of the aluminum acts as a container, which in turn keeps the molten aluminum from running into the molten aluminum located in the adjacent particles. The particles thus maintain their individuality.

The length of the fuel element may theoretically be indefinitely long. However it is conventional to manufacture aluminum fuel elements in plate form on the order or twenty eight inches long, with the widths ranging from approximately three to four inches, and the thickness from 0.030 inch to 0.120 inch.

The above process has been described largely in conjunction with nuclear fuel elements, but a similar method may be employed in the fabrication of nuclear control rod components. In such an instance the process including the various layers of clad and core powder are substantially identical. A suitable control core may be comprised of fifty percent by weight boron carbide and fifty percent by weight of aluminum. By the employment of this method considerably more neutron absorbing material may be placed in the core of the components, than may be done by conventional methods, and additionally such manufacture can be accomplished on a continuous basis, so that a light weight shielding material is fabricated. The elements so fabricated could be used not only as a control rod but for shielding purposes, thus providing a light weight matrix material as for example aluminum, with a relatively great quantity of shielding material in the carrier, such as boron or enriched boron ($B^{10}$).

From the foregoing it will now be seen that there is herein provided an improved method of fabricating nuclear fuel elements or the like, which accomplishes all of the objects of this invention, and others, including many advantages of great practical utility and commercial importance.

As many embodiments may be made of the method of this inventive concept, and as many modifications may be made in the embodiments herein before shown and described, it is to be understood that all matter herein is to be interpreted merely as illustrative and not in a limiting sense.

What is claimed is:

1. The method of producing clad nuclear fuel elements which comprises the steps of forming a first layer of particulate non-fissile metallic cladding material having a predetermined area, depositing thereon a layer of particulate fissile material of a lesser area than said first layer, depositing additional particulate non-fissile material on said first layer around said layer of fissile material to provide a border thereabout, depositing a second layer of particulate non-fissile metallic cladding material equal in area to said first layer of non-fissile material on top of said bordered layer of fissile material, heating the superposed layers to above recrystallization temperatures of said cladding material but below the point where the particles lose their individuality, and hot rolling the heated superposed layers of particulate material.

2. The method according to claim 1, said particulate fissile material consisting essentially of an alloy of aluminum and a fissionable metal.

3. The method according to claim 1, said particulate fissile material consisting essentially of an oxide selected from the group $UO_2$ and $U_3O_8$ and containing aluminum as a binder.

4. The method according to claim 1, said particulate non-fissile cladding material consisting essentially of aluminum.

5. The method according to claim 1, said particulate non-fissile cladding material consisting essentially of aluminum and containing 1 to 2% by weight of nickel.

6. The method of manufacturing nuclear fuel elements which comprises the steps of forming a first layer of powdered non-fissile metallic cladding material having a predetermined area, depositing thereon a layer of powdered fissile material of lesser area than the first layer to provide a core for the fuel element, said powdered fissile material consisting essentially of a fissionable isotope selected from the group constituted by uranium and its respective compounds and containing aluminum as a binder, depositing additional powdered non-fissile material on said first layer around said layer of fissile material to form a border thereabout, depositing a second layer of powdered non-fissile material equal in area to said first layer of non-fissile material on top of said layer of fissile material, heating the superposed layers until they are plastically deformable by hot working but below the point where the particles lose their individuality, hot rolling the heated superposed layers of powdered material to form a unitary assembly of said layers, roller levelling the assembly, fluoroscopically locating the core, and shearing and machining the assembly to size.

7. The method of producing a composite solid nuclear reactor element from powdered material which comprises the steps of forming a first layer of predetermined area of powdered metallic cladding material consisting of discrete particles composed essentially of aluminum, depositing thereon a layer of powdered fissionable core material of lesser area than the first layer, bordering said layer of core material with powdered cladding material to equal the area of the first mentioned layer, depositing a second layer of powdered cladding material on said layer of core material, said second layer of cladding material being equal in area to said first layer, heating the formed layers to above the recrystallization temperatures of said cladding material but below the point where the particles lose their individuality, hot rolling said layers into a unitary assembly, roller levelling the assembly, fluoroscopically locating the core, and shearing and machining the assembly to size and brazing the assembly.

References Cited in the file of this patent

UNITED STATES PATENTS

| 2,332,737 | Marvin et al. | Oct. 26, 1943 |
| 2,805,473 | Handwerk | Sept. 10, 1957 |
| 2,873,209 | Gage | Feb. 10, 1959 |
| 2,907,705 | Blainey | Oct. 6, 1959 |

FOREIGN PATENTS

| 369,964 | Great Britain | Mar. 18, 1932 |

OTHER REFERENCES

Abstract of F. Kelly, 668 O.G. 539, abstract No. 18,861, published March 10, 1953.

International Conference on the Peaceful Uses of Atomic Energy, 1955, volume 9, pp. 203–207. (Copy in Library.)

AEC Document, ANL–5629, June 1957, pp. 214–216 and in particular p. 196. (Copy in Library.)

AEC Document, NAA–SR–1934, December 15, 1957, pp. 51–55. (Copy in Library.)